Feb. 16, 1926.
C. J. BARNES
1,573,670
BAIT DEPOSITOR FOR RODENTS
Filed April 30, 1925
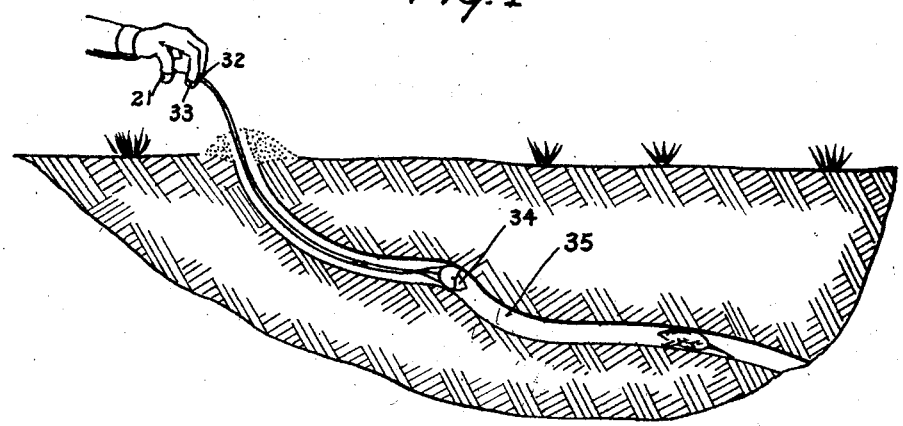
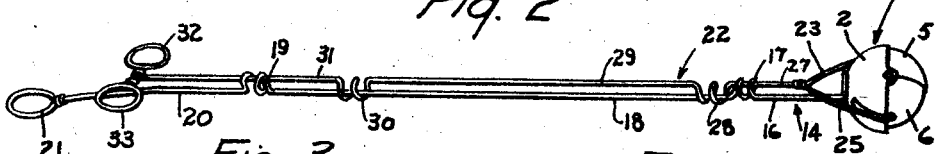
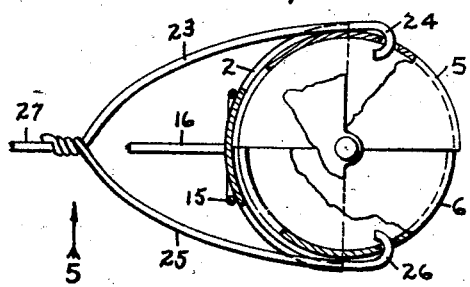
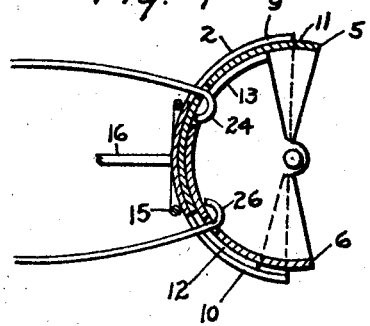
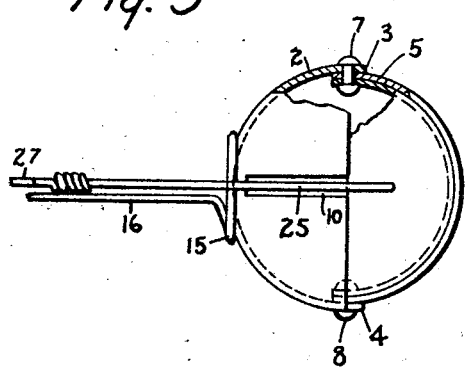
Inventor
Charles J. Barnes
by: Hazard and Miller
Attys.

Patented Feb. 16, 1926.

1,573,670

UNITED STATES PATENT OFFICE.

CHARLES J. BARNES, OF REDLANDS, CALIFORNIA.

BAIT DEPOSITOR FOR RODENTS.

Application filed April 30, 1925. Serial No. 26,906.

*To all whom it may concern:*

Be it known that I, CHARLES J. BARNES, a citizen of the United States, residing at Redlands, in the county of San Bernardino and State of California, have invented new and useful Improvements in Bait Depositors for Rodents, of which the following is a specification.

This invention is a bait depositor for rodents and consists of the novel features herein shown, described and claimed.

An object is to make a device by which a suitable bait may be inserted into a gopher hole or the like and deposited in a suitable position free from dirt.

Another object is to make a bait depositor having a cage in which the bait may be placed and provided means for opening the cage to deposit the bait in a gopher hole or the like.

Other objects and advantages will appear from the drawings and specification. The drawings illustrate the invention.

Figure 1 is a fragmentary section showing a gopher hole in the ground and a bait being deposited in the gopher hole in accordance with the principles of my invention.

Fig. 2 is a perspective of the bait depositor shown in Fig. 1 and showing the cage closed.

Fig. 3 is a fragmentary sectional detail of the cage with the parts in closed positions.

Fig. 4 is a fragmentary sectional detail of the cage with the parts in open positions.

Fig. 5 is a view partly in elevation and partly in section as seen looking in the direction indicated by the arrow 5 in Fig. 3.

The details of construction and operation are as follows:

The bait cage 1 consists of a hemi-spherical shell 2 having bearing ears 3 and 4 and hemi-spherical shutters 5 and 6 pivotally connected to the ears 3 and 4 by rivets 7 and 8. The hemi-spherical shutter 5 fits within the hemi-spherical shell 2 and the hemi-spherical shell 6 fits within the shell 5, so that when the cage is open as in Fig. 4 the shells 5, 6 and 2 are nested and so that when the cage is closed as in Figs. 2, 3 and 5, a hollow sphere is formed.

Slots 9 and 10 are formed in the shell 2 from its edge and diametrically opposite each other. A similar slot 12 is formed in the shell 5 and a slot 13 is formed in the shell 6, the slots 9 and 13 being in alinement at one side and the slots 10 and 12 being in alinement at the opposite side. The cage carrying handle member 14 is formed of wire, has a transverse ring 15 fitting against the shell 2 and is secured in place by soldering or in any suitable way. The spacing bar 16 extends from the ring 15, a bearing coil 17 is formed upon the outer end of the spacing bar 16, a spacing bar 18 extends from the bearing coil 17, a bearing ring 19 is formed upon the opposite end of the bar 18 from the coil 17, a handle bar 20 extends from the bearing ring 19 and a finger loop 21 is formed upon the handle 20.

The cage opening handle member 22 is formed of wire and has a fork 23 with a hook 24 upon its free end, said hook extending through the slot 9 and extending through a close fitting hole in the shell and having a retaining hook 24 inside of the shell 5 which operates in the slot 13 when the parts are nested.

In a similar manner a fork 25 extends through the slots 10 and 12 and through an opening in the shell 6 and has a retaining hook 26 inside of the shell 6. A spacing bar 27 extends from the junction of the forks 23 and 25, a bearing coil 28 is formed upon the spacing bar 27. A spacing bar 29 extends from the coil 28, a bearing coil 30 is formed upon the opposite end of the bar 29 from the coil 28, a spacing bar 31 extends from the coil 30 and finger loops 32 and 33 are formed upon the outer end of the bar 31. The bar 31 slides through the coil 19. The coil 30 slides upon the bar 18. The bar 27 extends through the coil 17 and the coil 28 slides upon the bar 18. The coils 28 and 30 are between the coils 17 and 19 so that when the finger loops 32 and 33 are moved away from finger loop 31 the cage is closed and the coil 28 engages the coil 17 to stop the movement, and in a like manner when the finger loops 32 and 33 are moved towards the loop 21 to open the cage, the coil 30 strikes the coil 19 to limit the opening movement.

In the practical operation a rodent bait 34 is placed in the cage 1, the finger loops 32 and 33 are moved away from the loop 21 to close the cage and the device is inserted into the gopher hole 25 to the desired extent and the finger loops 32 and 33 are moved towards the loop 21 to open the cage and deposit the bait in the gopher hole. The handle members 14 and 22 are flexible so that the device may be inserted into a crooked hole and the thumb of the operator may be inserted into the loop 21 and two fingers inserted into the loops 32 and 33 as shown in Fig. 1. After the cage has been opened and the bait deposited, the device is removed from the gopher hole.

In a similar manner the device may be used in rat holes and in other places where rodents are liable to find the bait.

The members 14 and 22 form flexible handles for the cage 1, the member 14 serving to hold the cage and the member 32 serving to open and close the cage.

Various changes may be made without departing from the spirit of my invention as claimed.

I claim:

1. A bait depositor for rodents comprising a device adapted to enclose a suitable bait to pass the bait into a gopher hole or the like and release the bait in the hole and a flexible means to insert the said device and a second flexible means to actuate the device.

2. A bait depositor for rodents comprising a bait holder adapted to protect the bait from dirt and a flexible carrying device adapted to be inserted into a crooked hole and release the bait said flexible carrying device having two flexible elements, one to hold the device and the other to operate the said device.

3. A bait depositor for rodents comprising in combination a bait carrier having a partly spherical shell, a partly spherical shutter pivotally connected to said shell to swing transversely thereof, a flexible wire for supporting the shell and a flexible wire to open the shutter whereby bait may be introduced into a gopher hole while protected from the dirt, and deposited therein.

4. A bait depositor for rodents comprising in combination a substantially hemispherical shell, a flexible supporting wire connected to the base of the shell, a pair of partly spherical shutters pivotally connected to said shell, a flexible actuating wire having a fork, the ends of the fork being connected to the shutters whereby the shutters may be opened by pulling on the actuating wire relative to the flexible supporting wire.

5. A bait depositor for rodents as claimed in claim 4 in which the shell is provided with a plurality of ears substantially on a diameter at right angles to the flexible supporting wire and is provided with slots to allow the movement of the fork.

6. A bait depositor for rodents as claimed in claim 4, in which the flexible supporting and the flexible actuating wires have a series of coils around each other to stiffen and guide the wires one in respect to the other.

In testimony whereof I have signed my name to this specification.

CHARLES J. BARNES.